INVENTORS.
James H. Shaffer
David M. Moulton
Warren R. Grimes

ATTORNEY.

INVENTORS.
James H. Shaffer
David W. Moulton
Warren R. Grimes

BY

ATTORNEY.

United States Patent Office 3,577,225
Patented May 4, 1971

3,577,225
METHOD FOR SEPARATING URANIUM, PROTACTINIUM, AND RARE EARTH FISSION PRODUCTS FROM SPENT MOLTEN FLUORIDE SALT REACTOR FUELS
James H. Shaffer, Oak Ridge, David M. Moulton, Knoxville, and Warren R. Grimes, Oak Ridge, Tenn., assignors to the United States of America as represented by the United States Atomic Energy Commission
Continuation-in-part of application Ser. No. 745,837, July 18, 1968. This application May 15, 1969, Ser. No. 824,944
The portion of the term of the patent subsequent to Oct. 21, 1986, has been disclaimed
Int. Cl. C22b 61/04
U.S. Cl. 23—325                                       5 Claims

ABSTRACT OF THE DISCLOSURE

A method for reprocessing spent molten metallic fluoride salt mixtures suitable as molten salt breeder reactor fuels is provided whereby uranium and bred-in protactinium values as well as certain fission products of the lanthanide series are selectively and consecutively extracted from the salt phase into an immiscible molten bismuth solution by controlling the reduction potential between the metal and salt phases. Uranium values, which are extracted first, are oxidized and transferred from the bismuth solution into a barren salt mixture for ultimate recycle to the reactor prior to extracting the contaminants. The protactinium values are then extracted at a slightly higher reduction potential into the bismuth solution, oxidized, and transferred to a molten salt outside the reactor enviroment to await decay of the protactinium-233 to uranium-233. Finally, the lanthanide elements are extracted at a yet higher reduction potential into the bismuth solution, oxidized, and transferred to a separate salt mixture for their recovery or disposal.

This application is a continuation-in-part of copending application S.N. 745,837, now Patent No. 3,437,897, filed July 18, 1968, in the names of James H. Shaffer et al.

BACKGROUND OF THE INVENTION

The invention herein was made in the course of, or under, a contract with the United States Atomic Energy Commission. It relates generally to methods for reprocessing nuclear reactor fuels and more particularly to a liquid metal reductive extraction method for reprocessing spent molten metallic fluoride salts containing fissile and fertile materials.

Molten metallic halide salts have been demonstrated as nuclear reactor core and blanket fluids and may be employed in thermal and/or fast converter or breeder reactors. Of recent importance is the detemination that a single-fluid, double-region molten salt breeder reactor, which is described in greater detail in copending application S.N. 733,843, filed on June 3, 1968, in the names of Edward S. Bettis et al. for "Single Fluid Molten Salt Nuclear Breeder Reactor," is feasible. In such a reactor, the molten salt will contain, in addition to the carrier material, thorium, uranium, protactinium, and rare earth fission products. If these molten salt breeder reactors are to become efficient, the core and blanket fluids must be periodically or continuously reprocessed of bred-in protactinium and major fission products which remain in solution in the molten salt mixture. Of these fission products, rare earth elements of atomic Nos. 57–62 of the lanthanide series generally account for more than 50 percent of the parasitic neutron absorption of the fuel mixture. The remaining fission products, which certainly contribute to the neutron poison fraction, are not considered vital to a reprocessing method and may be maintained at acceptable neutron poison levels by periodic salt discard. As used hereinafter the term "rare earths" is intended to refer only to those elements of atomic Nos. 57–62. Where thorium is present (e.g., either in the blanket salt for a two-region, two-fluid reactor or a core salt for a single-region, two-fluid reactor) thorium-232 is converted to uranium-233 and protactinium-233 is produced as an intermediate which if left in the reactor may capture a second neutron to produce non-fissionable uranium-234 instead of decaying to fissionable uranium-233.

Previously, a process was demonstrated for reprocessing a two-region, two-fluid spent molten fluoride salt mixture. In the fuel salt containing uranium and rare earth fission products but not thorium or protactinium the uranium values were removed first from the molten fluoride core salt by fluorination. Then the rare earths were separated from the lithium-beryllium fluoride mixture by extraction into a bismuth-lithium solution. This was proposed because it was thought in the art that insufficient difference in reduction potentials for uranium and rare earths existed to permit the separation of uranium from the rare earths by this process. Furthermore, it was not thought possible to construct a single-fluid molten salt breeder reactor because it was not believed that there existed differences in the extraction potentials sufficient to achieve the following separations (1) uranium from protactinium, thorium and rare earths, (2) protactinium from thorium and rare earths, and (3) rare earths from thorium. It is therefore highly desirable and an object of this invention to provide an efficient method for reprocessing spent molten metallic fluoride salt fluids of uranium and protactinium values as well as rare earth fission products which obviates the separate fluorination removal operation for uranium and also allows the construction of a single-fluid molten salt breeder reactor.

SUMMARY OF THE INVENTION

This object was achieved by the discovery that an electromotive series for uranium, protactinium, rare earth fission products, and thorium did exist which could provide sufficient difference in reduction potentials to permit the selective, reductive separation of uranium, protactinium values, and the rare earths from the molten fluoride salt by an extraction process. One embodiment of the invention comprises contacting a molten metal fluoride salt mixture, such as LiF—BeF$_2$—ThF$_4$—UF$_4$ (71.7—16—12—0.3 mole percent) useful as a single-fluid, double-region fuel, with molten bismuth and adding incrementally to the salt mixture which contains protactinium and rare earth fission products quantities of a metal reductant which is less noble in molten bismuth than uranium and protactinium or rare earths whereby each of these species is sequentially reduced to metal, transferred into a metal phase, and separately recovered by oxidizing the species to their respective fluorides, such as by bubbling hydrogen fluoride through a recovery molten fluoride salt mixture which is in contact with the bismuth solution, and transferring them into a salt phase. The uranium values may be recycled to the reactor for further service; the protactinium values are retained in a separate molten salt mixture awaiting their decay to uranium-233, and the rare earths can be discarded or recovered.

It may thus be seen that by this method the removal of uranium in a separate, highly corrosive, time consuming, processing operation by fluorination prior to extracting the protactinium values and the rare earths from the salt mixture is obviated. Moreover, the method of the invention lends itself to high volume throughput consistent with minimum space availability within the reactor containment facilities and is readily adaptable to remote processing with a minimum of control.

DESCRIPTION OF THE PREFERRED EMBODIMENTS

Figure 1:
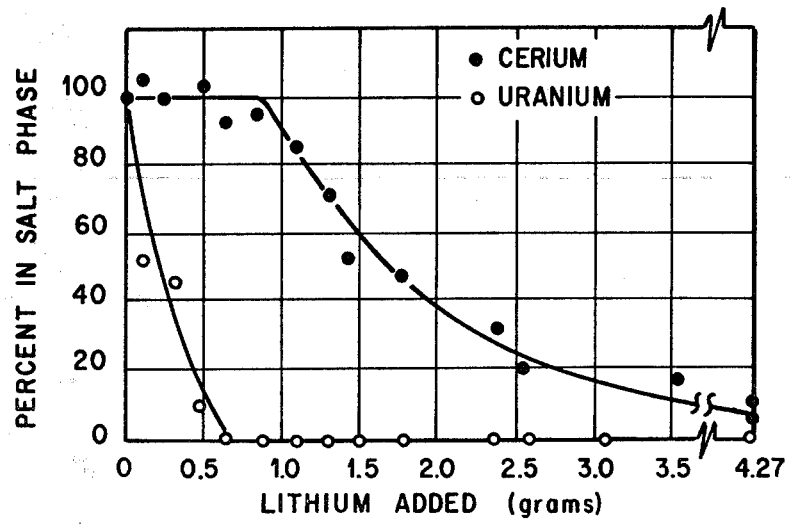
FIG. 1 is a plot showing the separation of uranium from cerium by reductive extraction with lithium from $LiF$—$BeF_2$—$UF_4$ (65.97—34.0—0.03 mole percent) into bismuth at 600° C.

In carrying out the invention a spent molten metal fluoride reactor fuel salt of, for example, $LiF$—$BeF_2$—$ThF_4$—$UF_4$ (71.7—16.0—12.0—0.3 mole percent) is contacted with bismuth, an immiscible, molten, inert metal extractant. This step may be conducted either multistage batchwise or countercurrent continuously. To initiate extraction of the bred-in materials and rare earth fission products from the molten salt a quantity of metal reductant selected from beryllium, lithium, and thorium is added to the salt or metal phase to reduce the fluoride values to metal and concomitantly effect a transfer of the reduced metal values into the metal extractant. It has been found that an order of nobility, i.e., uranium>protactinium>rare earth fission products>thorium exists which permits the selective removal of uranium, protactinium, and the rare earths by control of the concentration of reductant in the salt-metal system. It will be noted that in order to remove the bred-in and rare earth materials, the uranium, which is less electropositive than protactinium or the rare earth fission products, must be removed first. Accordingly, addition of the reductant is made to the system in a controlled manner to remove first all the uranium, then the protactinium and finally the rare earths.

Where the metal extractant is reused for the extraction of each of the species, it is necessary, in order to separately recover the uranium and protactinium values, to remove first the reduced uranium metal from the metal extractant and then the reduced protactinium metal prior to extracting the rare earth fission products. This may conveniently be effected by contacting the metal extractant with a recovery salt, which may preferably, but not necessarily, be of the same composition as the fuel mixture, and bubbling hydrogen fluoride therethrough, thereby oxidizing the uranium in the molten metal phase to its tetrafluoride salt and causing its transfer into the recovery salt. Then the protactinium may be oxidized and transferred into a separate recovery salt in the same manner. Alternatively, the metal extractant which contains the reduced uranium metal may be stored until the bred-in materials are removed from the spent molten salt into a separate metal extractant and then transferred into the purified molten salt by oxidizing the uranium metal to fluoride and causing the uranium fluoride to cross the metal salt interface into the molten salt, which may then be returned to the reactor. In a similar fashion, after the uranium values are separately removed and recovered, the protactinium values are separated from the rare earth fission products for retention in a separate molten salt, which may be of the same composition as the fuel mixture, outside the reactor environment to await their decay to uranium-233. Finally, the rare earths are separately removed and recovered from the spent molten metal fluoride salt.

The method of this invention is applicable to a wide range of molten fluoride salt mixtures useful as fuels for molten salt breeder reactors. Nonlimiting examples of these salt compositions include fluorides of the alkali metals, such as potassium fluoride, sodium fluoride, and lithium fluoride; and beryllium fluoride as molten salt mixtures with thorium fluoride and uranium tetrafluoride.

Where, for example, the molten salt mixture contains fissile and fertile material (i.e., a single-fluid, double-region fluid), concentrations of the rare earth fluorides and protractinium fluoride should typically be maintained at <100 p.p.m. and <25 p.p.m., respectively. Since the distribution of these elements between the two liquid phases is regulated by equilibrium reactions of the type $$4MF_{n(\text{salt phase})} + n\text{Th}°_{(\text{metal phase})}$$
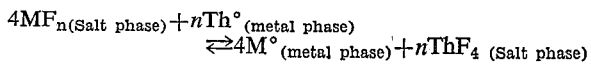
$$\rightleftharpoons 4M°_{(\text{metal phase})} + n\text{ThF}_4 \text{ (salt phase)}$$

where M is uranium, protactinium, or rare earths of valence $n$, the actual quantity of reductant required depends on the relative concentrations of salt phase constituents and the concentration of thorium required in the metal phase to effect the reduction of each selected metal. Thorium concentrations of less than .003 mole fraction in bismuth will suffice for successful application of a multistage processing scheme.

While any metal which in molten bismuth is less noble than uranium, protactinium, or the rare earths may serve as an equivalent reductant, certain considerations must be taken into account in its selection. It should be apparent that the metal reductant should be selected so as to avoid the addition of new metals to the molten salt and to minimize alteration of the chemical composition of the solvent mixture. Where the molten salt consists of lithium and beryllium fluoride, lithium or beryllium is preferred as the reductant. On the other hand, lithium, beryllium or thorium is preferred as the metal reductant for reprocessing either core salts for a single-fluid, double-region molten salt reactor or blanket salts for a two-fluid, two-region molten salt breeder reactor.

The temperature at which the extraction process is conducted may vary over a wide range. In general, both streams should be maintained at a temperature above the liquidus temperature of the particular molten fluoride salt employed. To insure a safe margin for process control, it is preferred that the temperature of the two streams be maintained at least 50° C. above the liquidus temperature of the molten salt. Higher temperatures may increase the corrosion rate of container materials and the complexity of operation; temperatures in excess of about 900° C. are not recommended. For a single-fluid, double-region molten salt composition of $LiF$—$BeF_2$—$ThF_2$—$UF_4$ (71.7—16.0—12.0—0.3 mole percent) a preferred reprocessing temperature range is 550° to 750° C.

Having described the invention in a general fashion the following examples are given to indicate with greater particularity the process parameters and techniques.

Example I

The feasibility of separating uranium from cerium by reductive extraction from a typical two-region molten salt breeder reactor fuel solvent into bismuth was established by the following example. A charge of 2.766 kg. of $LiF$—$BeF_2$—$UF_4$ (65.97—34.0—0.03 mole percent) containing 1.383 g. of cerous fluoride and about 1 mc. cerium-144, was placed in contact with 3.826 kg. of bismuth at 600° C. in a steel vessel. In an exploratory first step the cerium and uranium were reduced into the bismuth by addition of 3.2 grams of lithium metal. Then all of the cerium (~350 p.p.m.) and about half of the uranium (~900 p.p.m.) were reoxidized into the salt by addition of bismuth trifluoride. In the main part of the experiment successive small amounts of lithium metal reductant were added to the system and samples taken at 4 and 24 hours after the addition. Both the filtered salt samples and the unfiltered metal samples weighed an average of 2-3 grams.

The results are plotted in FIG. 1. For clarity the uranium concentration is expressed as a percentage of that found at the beginning of the second reduction. It is clear that uranium can be entirely removed from cerium in this way. At the point where substantially all the uranium was removed from the salt the separation factor of uranium from cerium was found to be about 4800. Since other experiments have shown that cerium is one of the most easily reduced rare earths, the separation factor between uranium and the other rare earths should be at least as large.

Example II

In this experiment separation of uranium, protactinium and thorium by reductive extraction from a typical two-fluid molten salt breeder reactor blanket material was established. A charge of 2.937 kg. of LiF—BeF$_2$—ThF$_4$—UF$_4$ (72.98—2—25—0.03 mole percent) containing about 1 mc. of protactinium-233 was placed in contact with 2.35 kg. of bismuth in a graphite vessel at 650° C. Successive small amounts of thorium metal reductant were added. Filtered samples were taken of each phase about one hour after each addition and analyzed by standard chemical and radiochemical methods.

Figure 2:
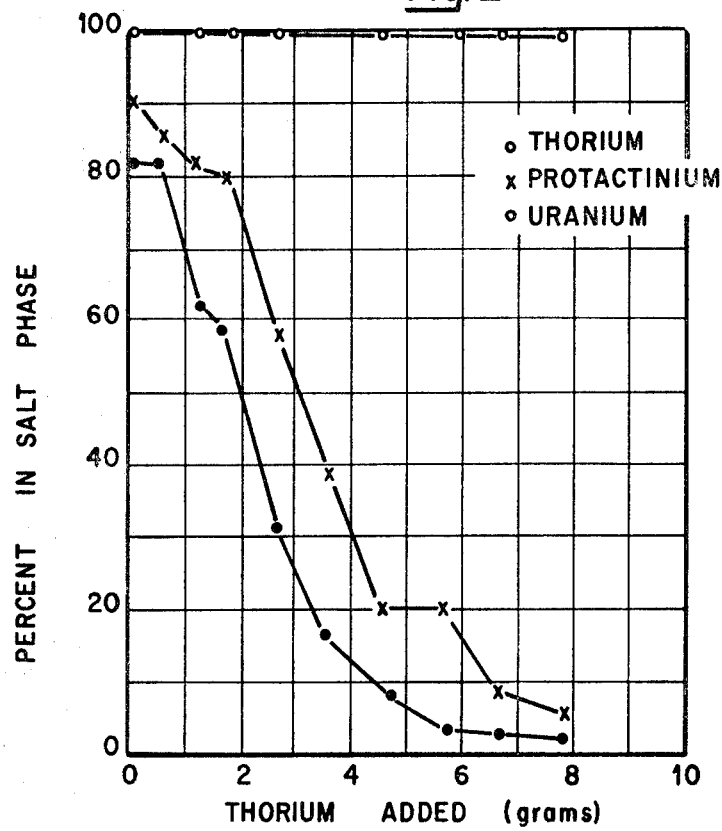
FIG. 2 is a plot showing the separation of uranium from protactinium and protactinium from thorium by reductive extraction with thorium from $LiF$—$BeF_2$—$ThF_4$—$UF_4$ (72.98—2.0—25.0—0.02 mole percent) into bismuth at 650° C.

The results are plotted in FIG. 2. The separation factor between uranium and protactinium is about 10, while the separation factor between protactinium and thorium is about 1000. The separation factor S is defined as:

$$S = \frac{DA}{DB} = \frac{(NA)_{metal}/(NA)_{salt}}{(NB)_{metal}/(NB)_{salt}}$$

where D is the distribution coefficient of metal A or B and N is the mole fraction of metal A or B in either salt or molten metal phase.

In a similar experiment 2.52 kg. of LiF—BeF$_2$—ThF$_4$ (73—2—25 mole percent), a simulated blanket salt, containing 1 mc. of protactinium-233 and 213 p.p.m. uranium was floated on 3.6 kg. of bismuth maintained in contact with 0.5 kg. of LiF—NaF—KF (46.5—11.5—42.0 mole percent) recovery salt. To the blanket salt mixture, 4 gram-equivalents of beryllium metal were added in small increments and hydrogen fluoride bubbled through the recovery salt to provide oxidizing conditions so as to cause the protactinium and uranium metal values carried by the bismuth to transfer into the recovery salt.

Example III

The feasibility of separating uranium from protactinium by reductive extraction from a typical single-fluid molten salt breeder reactor fuel solvent into bismuth was established by the following experiment. A charge of 3.15 kg. of LiF—BeF$_2$—ThF$_4$—UF$_4$ (71.7—16.0—12.0—0.3 mole percent) containing about 1 mc. of protactinium-233 was placed in contact with 3.00 kg. of bismuth in a graphite vessel at 600° C. Successive small amounts of thorium metal reductant were added. Unfiltered samples (~1 gram each) were taken of each phase after each addition and analyzed by standard chemical and radiochemical methods.

Figure 3:
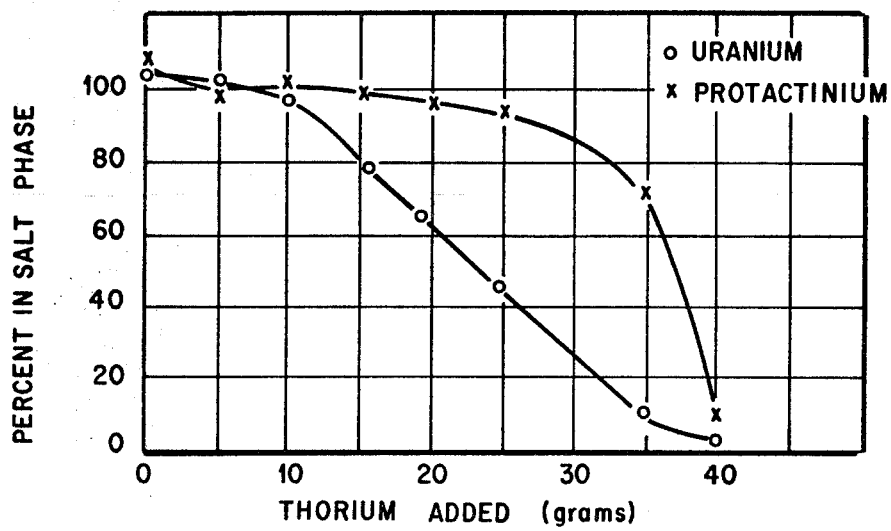
FIG. 3 is a plot showing the separation of uranium from protactinium by reductive extraction with thorium from $LiF$—$BeF_2$—$ThF_4$—$UF_4$ (71.7—16.0—12.0—0.03 mole percent) into bismuth at 600° C.

The results, which are plotted in FIG. 3, indicate that uranium extracts more easily than protactinium. Here the separation factor is about 30 so that in this salt the separation of uranium and protactinium can be made somewhat more readily than in Example II.

Example IV

The purpose of this experiment was an examination of distributions of $^{233}$Pa between the simulated fuel solvent of a single-region MSBR and bismuth as a function of the thorium concentration in bismuth up to its limit of solubility at 600° C. Approximately 3 kg. of bismuth was weighed into the graphite lined extraction vessel, heated to 900° C. under flowing helium, and sparged with hydrogen to remove moisture from the graphite liner and to reduce oxides from the bismuth. The salt mixture comprising LiF—BeF$_2$—ThF$_4$ (72—16—12 mole percent) was prepared separately in nickel equipment by combining fluoride salt components with a small quantity of irradiated thorium dioxide. This mixture was heated to 650° C. and, upon melting, was sparged with an anhydrous HF—H$_2$ mixture to remove oxide impurities. A final sparge treatment with hydrogen alone reduced concentrations of structural metal fluoride impurities to low levels. Approximately 3.91 kg. of this salt preparation was transferred as a liquid into the extraction vessel. The gamma activity in the salt preparation from the $^{233}$Pa was about $1.96 \times 10^4$ counts per minute per gram of the salt mixture.

Figure 4:
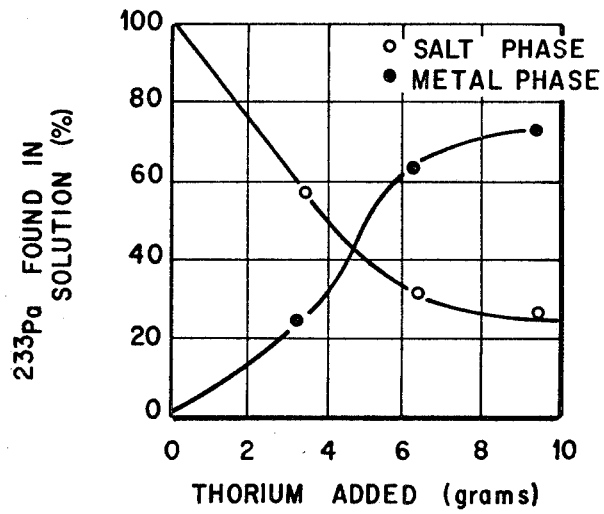
FIG. 4 is a plot showing the distribution of protactinium-233 between the liquid salt phase of $LiF$—$BeF$—$ThF_4$ (72—16—12 mole percent) and the bismuth metal phase at 650° C. as a function of thorium metal additions.

The results of $^{233}$Pa distribution between the two liquid phases as thorium metal was added to the system at 600° C. are illustrated in FIG. 4. At the thorium solubility limit in bismuth (~3500 p.p.m.), approximately 76% of the $^{233}$Pa activity was in the metal phase and the balance remained in the salt phase. These values correspond to a distribution coefficient (defined as mole fraction in metal phase/mole fraction in salt phase) for protactinium-233 of about 13.5. The separation factor for extracting $^{233}$Pa from thorium is about 520 for this system.

Although no example of separation of protactinium from rare earth fission products is given, this separation can be easily demonstrated. Dividing the separation factor for uranium from cerium in Example I by the separation factor for uranium from protactinium in Example II or III shows the separation factor for protactinium from cerium to be 160 or 480, the exact magnitude depending upon the composition of the molten salt mixture. In either case this factor is large enough to insure good separation.

Example V

The feasibility of separating cerium from single-fluid molten salt breeder reactor fuel solvent into bismuth was established in the following experiment. An extraction vessel was fabricated of 4-inch IPS stainless steel pipe with welded end-closures of stainless steel plate and lined with mild steel. The top plate was penetrated in two places by ¾-inch steel pipe which extended to within ½-inch of the bottom plate. These ports were used separately for adding reducing agent to the molten metal phase and for withdrawing samples directly from the molten metal phase without contacting the salt phase. A ¾-inch pipe just penetrated the top plate and was used initially to load bismuth and salt into the extraction vessel and subsequently to withdraw samples of the salt phase. Two additional small diameter penetrations of the top plate were used for inserting a thermowell and a reference electrode of beryllium metal into the system. The extraction vessel was mounted vertically in an electrical resistance tube furnace and operated at a temperature of 600° C.– 700° C.

Approximately three kilograms of high purity bismuth was placed in the extraction vessel followed by about three kilograms of purified salt solvent mixture selected from the LiF—BeF$_2$—ThF$_4$ salt system. Each salt mixture contained 100 to 110 p.p.m. by weight cerium as CeF$_3$. Approximately 5 millicuries of $^{144}$Ce was added to the salt during its preparation for analytical purposes. Weighed quantities of lithium were added to the metal phase followed by agitation, equilibration and sampling of each phase. This procedure was repeated until the thorium concentration of the molten metal phase reached its limit of solubility. Thorium and cerium were reduced from solution in the salt phase by lithium metal in the bismuth. The results of several experiments carried out at 600° C. and 700° C. are shown in Table I below.

TABLE I.—REDUCTIVE EXTRACTION OF CERIUM, LITHIUM AND THORIUM FROM LiF—BeF$_2$—ThF$_4$ MIXTURES INTO BISMUTH

| Temp. (°C.) | Salt composition (mole percent) | Distribution coefficients | | | Separation factors | | |
|---|---|---|---|---|---|---|---|
| | | $D_{Ce}$ | $D_{Li}$ | $D_{Th}$ [1] | $D_{Ce}/D_{Th}$ | $D_{Ce}/D_{Li}$ | $D_{Th}/D_{Li}$ |
| 600 | 72—16—12 | .077 | .0024 | .021 | 3.67 | 32.1 | 8.75 |
| 600 | 75—23—12 | .033 | .0098 | .021 | 1.57 | 33.7 | 21.4 |
| 600 | 64—30—6 | .088 | .0005 | .042 | 2.10 | 83.8 | 40.0 |
| 600 | 70—21—9 | .081 | .00161 | .028 | 2.89 | 50.3 | 17.4 |
| 600 | 68—20—12 | .049 | .00153 | .021 | 2.33 | 32.0 | 13.7 |
| 600 | 75—16—9 | .133 | .0032 | .028 | 4.75 | 41.6 | 8.75 |
| 600 | 74—20—6 | .243 | .0028 | .042 | 5.79 | 86.8 | 15.0 |
| 700 | 72—16—12 | .157 | .0045 | .053 | 2.64 | 24.56 | 9.30 |
| 700 | 65—23—12 | .10 | | .053 | 1.89 | | |
| 700 | 64—30—6 | .70 | | .106 | 1.89 | | |
| 700 | 70—21—9 | .17 | | .070 | 2.43 | | |
| 700 | 68—20—12 | .13 | .0043 | .053 | 2.35 | 30.23 | 12.33 |
| 700 | 75—16—9 | .31 | .0086 | .070 | 4.43 | 36.05 | 8.14 |
| 700 | 78—16—6 | .51 | .0095 | .106 | 4.81 | 53.68 | 11.58 |
| 700 | 74—20—6 | .45 | .0077 | .106 | 4.25 | 58.44 | 13.77 |

[1] Based on thorium solubility in bismuth by J. S. Bryner and M. B. Brodsky, Proc., 2nd Int. Conf. on Peaceful Uses of Atomic Energy 7, 209 (1958).

The results of these experiments attest to the separability of cerium from both lithium and thorium by a reductive extraction process as demonstrated by their respective separation factors being greater than unity under equilibrium conditions.

Example VI

Two experiments were carried out as described in Example V except that 100 to 110 p.p.m. by weight of neodymium was added to the salt solution in one experiment and a similar concentration of samarium was added to a separate salt mixture in the other experiment. The salt solvent mixture of each experiment consisted of LiF—BeF$_2$—ThF$_4$ (72—16—12 mole percent). The results, which are given in Table II below, demonstrate that the rare earths can be separated from thorium and that the reductive extraction process of the present invention is chemically feasible.

TABLE II.—REDUCTIVE EXTRACTION OF NEODYMIUM AND SAMARIUM FROM LiF—BeF$_2$—ThF$_4$ MIXTURES INTO BISMUTH

| Temp. (°C.) | Salt composition (mole percent) | Distribution coefficients | | | Separation factors | |
|---|---|---|---|---|---|---|
| | | $D_{Nd}$ | $D_{Sm}$ | $D_{Th}$ [1] | $D_{Nd}/D_{Th}$ | $D_{Sm}/D_{Th}$ |
| 600 | 72—16—12 | .051 | .045 | .021 | 2.43 | 2.14 |
| 700 | 72—16—12 | .142 | .053 | .053 | 2.68 | 1.55 |

[1] Based on thorium solubility in bismuth by J. S. Bryner and M. B. Brodsky, Proc., 2nd Int. Conf. on Peaceful Uses of Atomic Energy, 7, 209 (1958).

It should be noted that inasmuch as cerium, neodymium, and samarium have been successfully extracted into molten bismuth solutions from single-region fuels which contain large quantities of thorium, La, Pr, and Pm which are well known to have very similar chemical properties to the named species equally are extractable.

In summary, it has been shown that in the reductive extraction of uranium, protactinium, and the rare earths from molten fluoride salt breeder reactor fuels into bismuth in a temperature range of about 500° C. to 900° C., an order of nobility exists so that by controlling the concentration of the reductant metal in the bismuth it is possible to substantially separate and consecutively recover the uranium, protactinium, and the rare earths from the salt mixture. Inasmuch as the solvent properties of liquid bismuth are highly unusual and non-ideal and since the chemical properties of bred-in values and the rare earths in these salt-metal systems were very poorly known, it is completely unexpected that such a sequence would exist. The establishment of this sequence provides a basis for separating the bred-in protactinium values from the fertile salt stream of either a single-fluid or a two-fluid molten salt breeder reactor and also the separation of the rare earth fission products from single-fluid molten salt breeder reactor fuel solvents.

What is claimed is:

1. A method for separating uranium and protactinium values and rare earth fission products from spent single-fluid molten salt breeder reactor mixtures comprising the steps of contacting said salt mixture with molten bismuth, sequentially adding a metal reductant having a nobility less than said uranium, protactinium, and rare earths to said bismuth to thereby sequentially extract said uranium, protactinium, and rare earth from said salt phase into said bismuth, and recovering separately the extracted species from said bismuth.

2. The method of claim 1 wherein said metal reductant is selected from the groups consisting of lithium, beryllium, and thorium.

3. The method of claim 1 wherein said molten salt breeder reactor mixture comprises LiF—BeF$_2$—ThF$_4$—UF$_4$ (72—16—12—0.3 mole percent).

4. The method of claim 1 wherein said rare earth and protactinium values are about 100 p.p.m. and 25 p.p.m. respectively.

5. The method of claim 1 wherein said extraction is conducted at a temperature within the range of 550° C. to 900° C.

References Cited

UNITED STATES PATENTS

| | | | |
|---|---|---|---|
| 3,120,435 | 2/1964 | Chiotti | 23—325 |
| 3,130,042 | 4/1964 | Teitel | 23—325 |
| 3,284,190 | 11/1966 | Knighton et al. | 23—325 |
| 3,310,500 | 3/1967 | Kelly | 23—325 |
| 3,472,633 | 10/1969 | McNeese et al. | 23—343 |
| 3,495,975 | 2/1970 | Grimes et al. | 23—325 |

OTHER REFERENCES

Bareis et al., Nucleonics, vol. 12, #7, pp. 16–19 (1954).

CARL D. QUARFORTH, Primary Examiner

F. M. GITTES, Assistant Examiner

U.S. Cl. X.R.

23—20, 22, 23, 330, 339, 343, 353; 252—301.1